(12) United States Patent
Zhang

(10) Patent No.: US 11,221,443 B2
(45) Date of Patent: Jan. 11, 2022

(54) BACKLIGHT MODULE

(71) Applicant: WUHAN CHINA STAR OPTOELECTRONICS TECHNOLOGY CO., LTD., Hubei (CN)

(72) Inventor: Wei Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 374 days.

(21) Appl. No.: 16/494,880

(22) PCT Filed: Jun. 17, 2019

(86) PCT No.: PCT/CN2019/091454
§ 371 (c)(1),
(2) Date: Sep. 17, 2019

(87) PCT Pub. No.: WO2020/107865
PCT Pub. Date: Jun. 4, 2020

(65) Prior Publication Data
US 2021/0356651 A1 Nov. 18, 2021

(30) Foreign Application Priority Data
Nov. 30, 2018 (CN) .......................... 201811454041.2

(51) Int. Cl.
*F21V 8/00* (2006.01)

(52) U.S. Cl.
CPC ......... *G02B 6/0085* (2013.01); *G02B 6/0055* (2013.01); *G02B 6/0068* (2013.01); *G02B 6/0073* (2013.01); *G02B 6/0083* (2013.01)

(58) Field of Classification Search
CPC .. G02B 6/0086; G02B 6/0055; G02B 6/0068; G02B 6/0073; G02B 6/0083
See application file for complete search history.

(56) References Cited

U.S. PATENT DOCUMENTS

2013/0119358 A1* 5/2013 Sasaki .................. H01L 51/529
257/40

* cited by examiner

*Primary Examiner* — Leah Simone Macchiarolo

(57) ABSTRACT

A backlight module. Heat sinks fill gaps between the light sources and the reflective sheet, which greatly improves the heat dissipation efficiency. Current backlight module has no space for a heat sink due to the limitation of the structure space. The invention provides a heat dissipation performance of the backlight module by optimizing to find a relatively unique position to place the heat dissipation material. The invention can effectively and quickly dissipate heat of a light emitting diode (LED) lamp to avoid problems such as reliability analysis (RA) test fluctuations.

16 Claims, 2 Drawing Sheets

BACKLIGHT MODULE

FIELD OF INVENTION

The present invention relates to the field of display devices, and in particular, to a backlight module.

BACKGROUND OF INVENTION

With development of display technologies, flat display devices, such as liquid crystal displays (LCDs), are widely used in various consumer electronic products such as mobile phones, televisions, personal digital assistants, digital cameras, laptops, and desktops, etc. because of their high image quality, power saving, thin body, and wide application range, and becoming the mainstream in display devices.

Most of the liquid crystal display devices on the market are backlight type liquid crystal display devices, which comprise liquid crystal display panels and backlight modules. The working principle of a liquid crystal display panel is to place liquid crystal molecules in two parallel glass substrates, with many vertical and horizontal small wires between the two glass substrates. The liquid crystal molecules are controlled to change directions by being energized or not, and refract light of the backlight module to produce pictures.

Because the liquid crystal display panel itself does not emit light, a light source provided by the backlight module is required to display the image normally. Therefore, the backlight module becomes one of the key components of the liquid crystal display device. The backlight module is divided into a side-in type backlight module and a direct-type backlight module according to different incident positions of the light source. Wherein, the light source of the side-in backlight module is disposed on an edge of a backplane behind the liquid crystal panel, the light enters a light guide plate from a light incident surface on a side of the light guide plate, reflected and diffused from a light exit surface of the light guide plate, and forms a surface light source for the liquid crystal panel.

Technical Problem

FIG. 1 is a front elevational view showing a current side-in type backlight module. Referring to FIG. 1, a backlight module 1 comprises a receiving cavity 10, a plurality of light sources 11, and a reflector 12. The light source 11 is disposed on a surface of the receiving cavity 10. The reflector 12 is disposed opposite to the light source 11. Two of the light sources 11 are schematically depicted in the drawings. A light emitting surface of the backlight module 1 is perpendicular to a paper surface. As a size of a liquid crystal display panel increases, a brightness of the backlight module is required to be higher, the number of the light source 11 is increasing, and the amount of heat generation is also increasing. As shown in FIG. 1, in a Z direction, there is a gap A between the light source 11 and the reflector 12 (as indicated by the arrow A in the drawings), which is not conducive to the heat dissipation of the light source 11.

Technical Solution

The technical problem to be solved by the present invention is to provide a backlight module capable of having high heat dissipation efficiency.

In order to solve the above problems, the present invention provides a backlight module. The backlight module comprises a receiving cavity having a mounting surface and a reflecting surface opposite to the mounting surface, a plurality of light sources mounted on the mounting surface of the receiving cavity, a reflective sheet disposed on a reflective surface of the receiving cavity for reflecting light emitted by the light source, and a plurality of heat sinks disposed between the light sources and the reflective sheet. The heat sink is a graphite sheet. A thickness of the heat sink is equal to a distance between the reflective sheet and the light source, and an area of the heat sink facing the surface of the light source is larger than an area of the light source facing the surface of the heat sink.

In an embodiment, the heat sink is attached to the reflective sheet.

In an embodiment, the heat sinks are arranged in one-to-one correspondence with the light sources.

In an embodiment, a light source circuit board is disposed on the mounting surface, and the light source is connected to the light source circuit board.

In an embodiment, the light source is a light emitting diode.

In an embodiment, the backlight module further comprises a heat dissipation backplane, a surface of the heat dissipation backplane serves as the reflective surface of the receiving cavity, and the reflective sheet is disposed on the heat dissipation backplane.

In an embodiment, the backlight module further comprises a light guide plate extending from the outside of the receiving cavity to the receiving cavity, and a light incident surface of the light guide plate serves as a light emitting surface of the receiving cavity.

In order to solve the above problems, the present invention further comprises a backlight module. The backlight module comprises a receiving cavity having a mounting surface and a reflecting surface opposite to the mounting surface, a plurality of light sources mounted on the mounting surface of the receiving cavity, a reflective sheet disposed on the reflective surface of the receiving cavity for reflecting light emitted by the light source, and a plurality of heat sinks disposed between the light sources and the reflective sheet.

In an embodiment, the heat sink is attached to the reflective sheet.

In an embodiment, a thickness of the heat sink is equal to a distance between the reflective sheet and the light source.

In an embodiment, an area of the heat sink facing the surface of the light source is larger than an area of the light source facing the surface of the heat sink.

In an embodiment, the heat sinks are arranged in one-to-one correspondence with the light sources.

In an embodiment, the heat sink is a graphite sheet.

In an embodiment, a light source circuit board is disposed on the mounting surface, and the light source is connected to the light source circuit board.

In an embodiment, the light source is a light emitting diode.

In an embodiment, the backlight module further comprises a heat dissipation backplane, a surface of the heat dissipation backplane serves as the reflective surface of the receiving cavity, and the reflective sheet is disposed on the heat dissipation backplane.

In an embodiment, the backlight module further comprises a light guide plate extending from the outside of the receiving cavity to the receiving cavity, and a light incident surface of the light guide plate serves as a light emitting surface of the receiving cavity.

Beneficial Effect

An advantage of the present invention is that heat sinks fill gaps between light sources and a reflective sheet, and heat generated by the light sources is transmitted to the reflective sheet through the heat sinks, then transmitted to a backplane, and then distributed to the air, which greatly improving the heat dissipation efficiency.

Another advantage of the present invention is that current backlight modules have no space for heat sinks to be placed on a surface due to the limitation of a structure space. The present invention provides a heat dissipation material of a backlight module by optimizing to find a relatively unique position to place the heat dissipation material.

Another advantage of the present invention is that a heat dissipation scheme directly for a light emitting diode (LED) lamp is matched with a current iron backplane design to effectively and efficiently dissipate heat of the LED lamp to avoid problems such as reliability analysis (RA) test fluctuations.

DETAILED DESCRIPTION OF PREFERRED EMBODIMENTS

Specific embodiments of a backlight module of the present invention will be described in detail below with reference to accompanying drawings.

Figure 2:
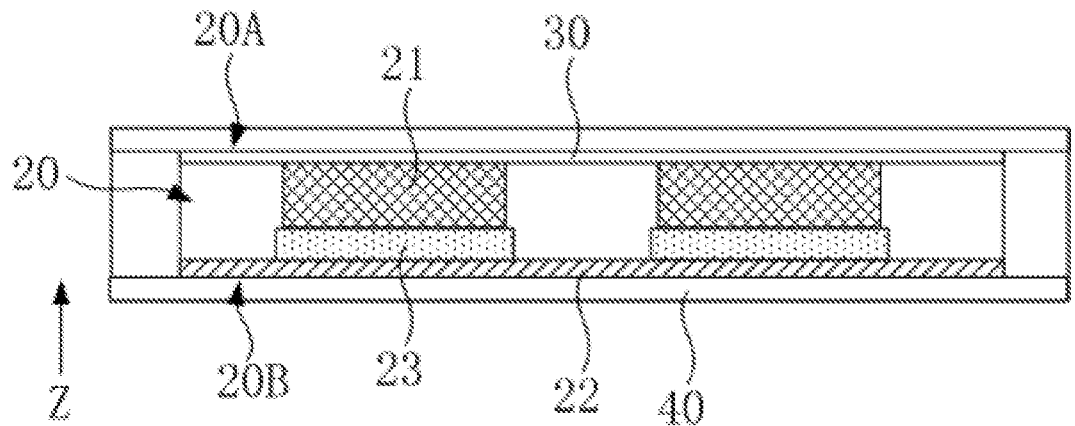
FIG. 2 is a front view showing a structure of a backlight module of the present invention.
Figure 3:
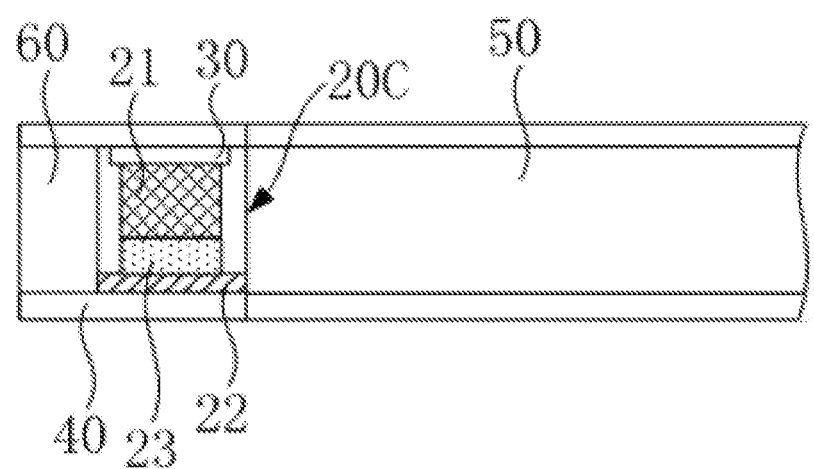
FIG. 3 is a side view showing the structure of the backlight module of the present invention.

FIG. 2 is a front view showing a structure of a backlight module of the present invention. FIG. 3 is a side view showing the structure of the backlight module of the present invention. Referring to FIG. 2 and FIG. 3, a backlight module 2 of the present invention comprises a receiving cavity 20, a plurality of light sources 21, a reflective sheet 22, and a plurality of heat sinks 23.

The receiving cavity 20 comprises a mounting surface 20A and a reflecting surface 20B. The reflecting surface 20B is opposite to the mounting surface 20A. Specifically, the mounting surface 20A is disposed at a top wall or a bottom wall of the receiving cavity 20, and the reflecting surface 20B is disposed at a bottom wall or a top wall of the receiving cavity 20. For example, in the present embodiment, the mounting surface 20A is disposed at the top wall of the receiving cavity 20, and the reflecting surface 20B is disposed at the bottom wall of the receiving cavity 20. Wherein, a side perpendicular to the mounting surface 20A is a light emitting surface 20C, and the light emitting surface 20C allows light in the receiving cavity 20 to be emitted. Specifically, the backlight module 2 further comprises a light guide plate 50. The light guide plate 50 extends from the outside of the receiving cavity 20 to the receiving cavity 20, and a light incident surface of the light guide plate 50 serves as a light emitting surface 20C of the receiving cavity 20. The function of the light guide plate 50 is to introduce the light of the receiving cavity 20 into the display panel, which is a conventional structure and will not be described again. On a surface opposite to the light emitting surface 20C, a sealant 60 is disposed to seal the backlight module 2.

The light sources 21 are mounted on the mounting surface 20A of the receiving cavity 20. Specifically, the mounting surface 20A has a circuit capable of driving the light sources 21, and the light sources 21 are connected to the circuit. In this embodiment, the mounting surface 20A is provided with a light source circuit board 30, the light sources 21 are connected to the light source circuit board 30, and the light source circuit board 30 drives the light sources 21 to emit light. The light sources 21 comprise, but are not limited to, a light emitting diode (LED). The number of the light sources 21 can be set according to actual needs. In the present embodiment, in order to clearly describe the technical solution of the present invention, two light sources 21 are schematically illustrated.

The reflective sheet 22 is disposed on the reflective surface 20B of the receiving cavity 20 for reflecting light emitted by the light sources 21. The reflective sheet 22 comprises, but is not limited to, a conventional reflective sheet in a current backlight module, for example, a metal sheet. The reflective sheet 22 can be disposed on the reflecting surface 20B by evaporation or physical bonding. Further, the backlight module 2 further comprises a heat dissipation backplane 40. One surface of the heat dissipation backplane 40 serves as the reflecting surface 20B of the receiving cavity, and the reflective sheet 22 is disposed on the heat dissipation backplane 40. In the present embodiment, the heat dissipation backplane 40 is an iron backplane, and heat in the receiving cavity 20 can be dissipated through the heat dissipation backplane 40.

The heat sinks 23 are disposed between the light sources 21 and the reflective sheet 22. Specifically, the heat sinks 23 are disposed between the light sources 21 and the reflective sheet 22 in a Z direction. The Z direction refers to a direction perpendicular to a light exiting direction of the receiving cavity 20. The heat sinks 23 of the backlight module are configured to dissipate heat due to heat dissipation performance of air. In the present invention, the heat sinks 23 are arranged in one-to-one correspondence with the light sources 21. That is, one of the heat sinks 23 is disposed between the light source 21 and the reflection sheet 22. In other embodiments of the present invention, the heat sinks 23 and the light sources 21 may not correspond to each other according to actual needs. For example, one heat sink 23 is disposed between the first light source 21 and the reflection sheet 22, another heat sink 23 is disposed between the third light source 21 and the reflection sheet 22, and so on. The heat sinks 23 are spaced apart.

Preferably, in the embodiment, the heat sink 23 is a graphite sheet. Further, the heat sink 23 is attached to the reflective sheet 22, and the attaching method thereof comprises, but is not limited to, using an anisotropic conductive film (ACF) adhesive tape. In the present embodiment, a thickness of the heat sink 23 is equal to a distance between the reflective sheet 22 and the light source 21. That is, one surface of the heat sink 23 is in contact with the reflective sheet 22, and the other surface is in contact with the light source 22 to improve heat dissipation efficiency. In other embodiments of the present invention, the thickness of the heat sink 23 may also be smaller than the distance between the reflective sheet 22 and the light source 21.

Figure 1:
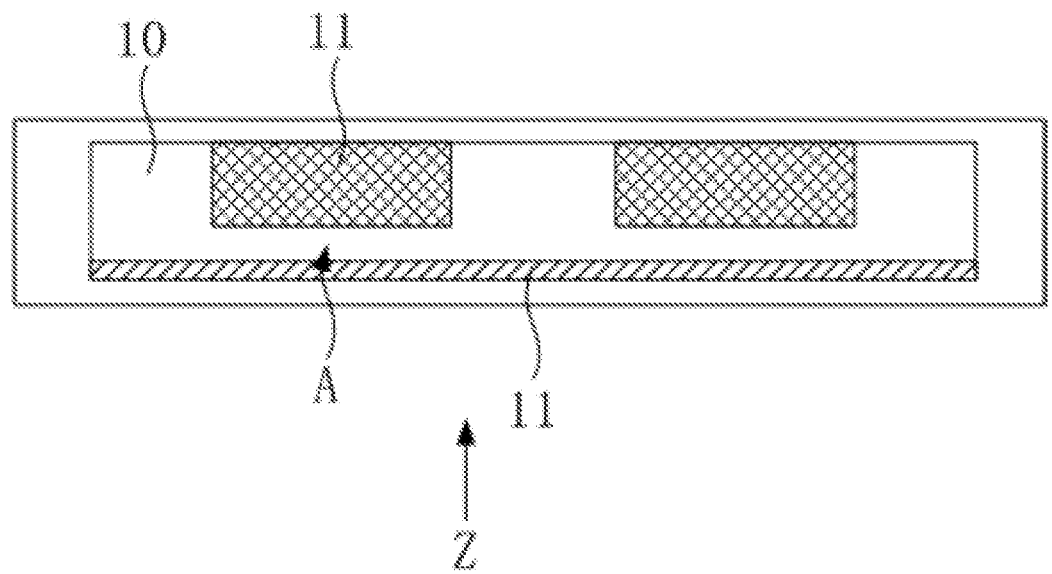
FIG. 1 is a schematic structural view of a current side-in type backlight module.

In the prior art, referring to FIG. 1, there is a gap A between the light source 21 and the reflective sheet 22 in the Z direction. This means that the heat of the light source 21 needs to be dissipated through the air, the heat dissipation efficiency is low, and the current product has no space to place the heat sink due to the limitation of the construction space. The heat sink 23 of the backlight module of the present invention fills a gap between the light source 21 and the reflective sheet 22, the heat generated by the light source 21 is transmitted to the reflective sheet 22 through the heat sink 23, then transmitted to the heat dissipation backplane 40, and then to the air. It can effectively and quickly dissipate the heat of a light emitting diode (LED) lamp, greatly improving the heat dissipation efficiency and avoiding problems such as reliability analysis (RA) test fluctuations.

Further, in the embodiment of the present invention, an area of the heat sink 23 facing the surface of the light source 21 is larger than an area of the light source 21 facing the surface of the heat sink 23. Specifically, the area of the heat sink 23 projected in the Z direction is larger than the area of the light source 21 projected in the Z direction to further increase the heat dissipation efficiency. In other embodiments of the present invention, the area of the heat sink 23 projected in the Z direction may be equal to the area of the light source 21 projected in the Z direction, which is not limited in the present invention.

The above description is only a preferred embodiment of the present invention. It should be noted that many modifications and refinements can be made by those skilled in the art without departing from the principles of the invention, and such improvements and modifications should also be considered as the scope of protection of the present invention.

INDUSTRIAL APPLICABILITY

The subject matter of the present application can be manufactured and used in the industry with industrial applicability.

What is claimed is:

1. A backlight module, comprising:
a receiving cavity comprising a mounting surface and a reflecting surface opposite to the mounting surface;
a plurality of light sources mounted on the mounting surface of the receiving cavity;
a reflective sheet disposed on a reflective surface of the receiving cavity for reflecting light emitted by the light source; and
a plurality of heat sinks disposed between the light sources and the reflective sheet, wherein the heat sink is a graphite sheet, a thickness of the heat sink is equal to a distance between the reflective sheet and the light source, and an area of the heat sink facing the surface of the light source is larger than an area of the light source facing the surface of the heat sink.

2. The backlight module as claimed in claim 1, wherein the heat sink is attached to the reflective sheet.

3. The backlight module as claimed in claim 1, wherein the heat sinks are arranged in one-to-one correspondence with the light sources.

4. The backlight module as claimed in claim 1, wherein a light source circuit board is disposed on the mounting surface, and the light source is connected to the light source circuit board.

5. The backlight module as claimed in claim 1, wherein the light source is a light emitting diode.

6. The backlight module as claimed in claim 1, wherein the backlight module further comprises a heat dissipation backplane, a surface of the heat dissipation backplane serves as the reflective surface of the receiving cavity, and the reflective sheet is disposed on the heat dissipation backplane.

7. The backlight module as claimed in claim 1, wherein the backlight module further comprises a light guide plate extending from the outside of the receiving cavity to the receiving cavity, and a light incident surface of the light guide plate serves as a light emitting surface of the receiving cavity.

8. A backlight module, comprising:
a receiving cavity comprising a mounting surface and a reflecting surface opposite to the mounting surface;
a plurality of light sources mounted on the mounting surface of the receiving cavity;
a reflective sheet disposed on a reflective surface of the receiving cavity for reflecting light emitted by the light source; and
a plurality of heat sinks disposed between the light sources and the reflective sheet,
wherein a thickness of the heat sink is equal to a distance between the reflective sheet and the light source.

9. The backlight module as claimed in claim 8, wherein the heat sink is attached to the reflective sheet.

10. The backlight module as claimed in claim 8, wherein an area of the heat sink facing the surface of the light source is larger than an area of the light source facing the surface of the heat sink.

11. The backlight module as claimed in claim 8, wherein the heat sinks are arranged in one-to-one correspondence with the light sources.

12. The backlight module as claimed in claim 8, wherein the heat sink is a graphite sheet.

13. The backlight module as claimed in claim 8, wherein a light source circuit board is disposed on the mounting surface, and the light source is connected to the light source circuit board.

14. The backlight module as claimed in claim 8, wherein the light source is a light emitting diode.

15. The backlight module as claimed in claim 8, wherein the backlight module further comprises a heat dissipation backplane, a surface of the heat dissipation backplane serves as the reflective surface of the receiving cavity, and the reflective sheet is disposed on the heat dissipation backplane.

16. The backlight module as claimed in claim 8, wherein the backlight module further comprises a light guide plate extending from the outside of the receiving cavity to the receiving cavity, and a light incident surface of the light guide plate serves as a light emitting surface of the receiving cavity.

* * * * *